Feb. 17, 1970  E. HERB ET AL  3,495,493
CUTTING OR STAMPING MACHINE HAVING EXCHANGEABLE
STAMPING OR CUTTING TOOL
Filed April 25, 1967  2 Sheets-Sheet 1

INVENTORS
Eugen Herb
Helmut Bauer
by McGlew & Toren
ATTORNEYS.

3,495,493
CUTTING OR STAMPING MACHINE HAVING EXCHANGEABLE STAMPING OR CUTTING TOOL
Eugen Herb, Ditzingen, and Helmut Bauer, Maichingen, Germany, assignors to Firma Trumpf & Co., Stuttgart-Weilimdorf, Germany
Filed Apr. 25, 1967, Ser. No. 633,475
Claims priority, application Germany, Apr. 29, 1966, 1,552,102
Int. Cl. B26d 7/26
U.S. Cl. 83—698                                    10 Claims

ABSTRACT OF THE DISCLOSURE

A cutting or stamping device for use with a tool which has a groove defining a retaining shoulder thereabove includes a ram which is displaceably carried in a holder and which has a bore at one end for receiving the tool therein. A tool holding sleeve is carried on the interior of the ram and is movable transverse to the axis of the bore of the ram for engaging in the groove of the tool under the shoulder to hold the tool in an operative position. A safety lever is pivotally mounted on the holder and it is connected to the holding sleeve in a manner such that it permits the sleeve to engage against the tool to hold it in an operative position but it may be moved outwardly to displace the sleeve to an inoperative position to release the tool.

SUMMARY OF THE INVENTION

This invention relates in general to cutting or stamping devices and in particular to a new and useful cutting or stamping machine having an exchangeable cutting or stamping tool which is arranged in a tool ram and which is held at a safe operating position by a movable holding sleeve.

Various types of tool rams with exchangeable stamping or cutting tools are known. The tools are retained either mechanically or by power coupling. In a particularly simple mechanical connection, a securing screw is screwed into the tool ram crosswise to the longitudinal axis thereof to engage in a depression of the tool shank and hold it in position. The clamping effect of such a set screw arrangement is relatively bad and therefore it is only suitable for small force operation.

A better retention of the tool is achieved in another type of construction in which the securing plate is secured to the lower end face of the tool ram and has a bore for the tool to pass through. A collar or head is clamped at the inner end of the tool shank between the plate and the lower end face of the ram. A disadvantage of such an arrangement is that it is very difficult to remove and replace the tools as the underside of the ram is rather inaccessible in these machines. Other arrangements such as friction fits are provided but they are suitable only for small forces and usually require a wrench or tool for tightening which is easily lost.

In accordance with the invention there is provided a cutting or stamping tool in which the tool is formed with an annular cut-away portion forming a shoulder at its upper end which may be engaged from the underside by a securing sleeve which is carried by the ram and which may be moved transverse to the axis of the tool in order to lock the tool in a central bore of the ram. The holding sleeve is displaceably positioned on a block member mounted to the lower portion of the ram and it is actuated by a safety lever which may be pivoted outwardly from the side of the machine ram holder in order to release the tool to permit it to be dropped downwardly from the ram. When the tool is positioned in the bore of the ram, it is pressed upwardly against an ejection member and held in a locked position by the securing sleeve which engages under the shoulder of the tool. In the safe operating position of the sleeve, an operating lever connected to the sleeve will be oriented flush with the side of the holder of the ram so that the safety condition is indicated. When the sleeve is moved to a releasing position, the safety lever is moved outwardly from this side of the holder and it also engages a releasing bolt to move the slide out of a holding position to cause release of a tool under the ejecting force of an ejection member. The tool is locked against rotation relative to the ram by means of a locking nut which has a squared entrance opening into which the tool is positioned. The locking nut is secured to the lower face of the ram after the tool is in an operative position. By providing an annular cutout portion in the tool, it is possible to rotate the tool relative to the slide without impairing the connection of the tool in the slide. The slide holding and positioning bolt is spring loaded to urge the slide to engage tightly below the shoulder of the tool when it is in an engaged position.

Accordingly it is an object of the invention to provide an improved stamping or cutting tool having a holding sleeve with an opening through which the tool passes which is arranged to hold the cutting tool in a bore of a movable ram of the tool by engaging underneath a shoulder formation of the tool.

A further object of the invention is to provide an improved cutting tool with means for holding a tool piece to a movable ram which provides for safe holding operation and includes a safety lever which is moved outwardly in the unsafe or release position and which also advantageously includes a locking ring for securing the tool against rotation relative to the ram and means for ejecting the tool after the holding sleeve is moved to released position.

A further object of the invention is to provide a cutting or stamping tool which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION

Figure 1:
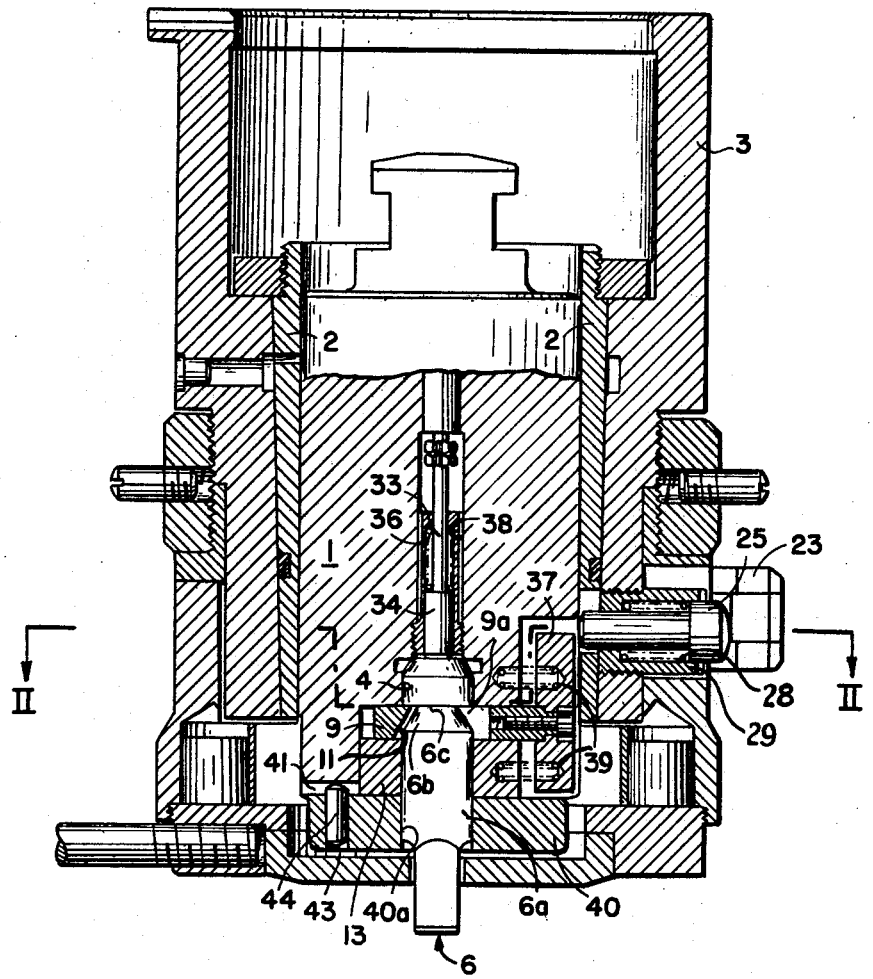
FIG. 1 is a longitudinal sectional view of a cutting machine constructed in accordance with the invention.

Referring to the drawings in particular, the invention embodied therein comprises a cutting tool which includes a ram 1 which is displaceably mounted in a sliding bushing 2 of a tool holder or housing 3. The tool ram 1 is provided with a bore 4 which extends centrally therethrough and is of a size for receiving a tool generally designated 6 which, in the embodiment illustrated, is a stamping tool. The tool 6 is provided with a clamping shank 6a which is provided with an annular groove 6b which defines a shoulder 6c.

In accordance with the invention, the tool 6 is held in position in the bore 4 of the ram 1 by means of a holding sleeve or slide member 9 having a bore 9a through which the tool shank portion 6a passes. In the operative holding position, the sleeve 9, it is displaced laterally, that is, transversely to the axis of the cutting tool 6 and the ram 1, in order to cause the sleeve to engage tightly with the shank of the tool 6 and below the shoulder 6c.

Figure 2:
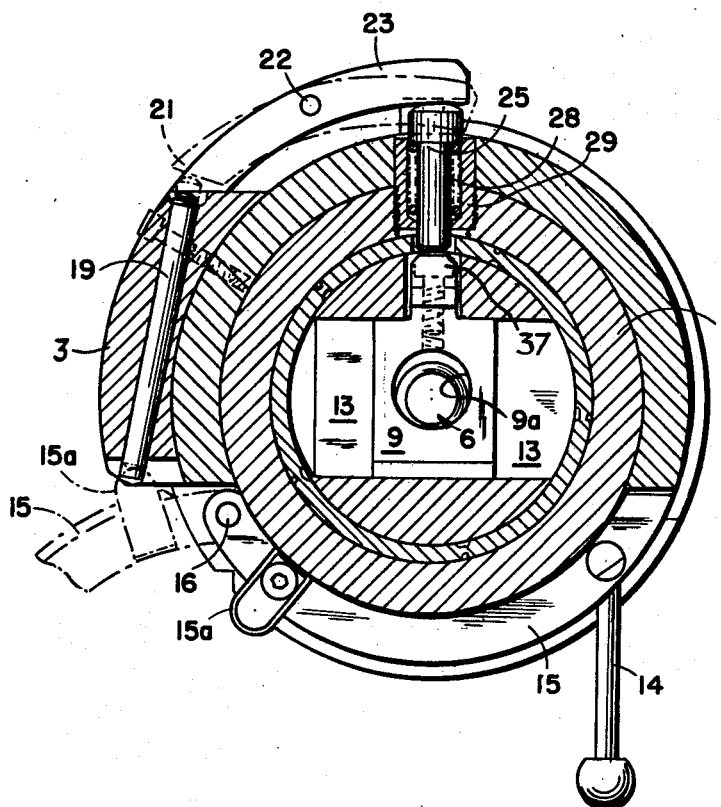
FIG. 2 is a view taken along the lines II—II of FIG. 1.

The tool 6 is installed in position by inserting it upwardly through the bore 4 when the sleeve 9 is displaced to the left from the view indicated in FIG. 1. The top of the tool 6 presses against an ejection plunger member 34 which has a shank portion 33 which rides in a guide 38 and which is biased downwardly by the force of an injection spring 36. In the uppermost position the sleeve 9 is then moved back to a locking position by engaging a hand-operated lever 14 which is carried at one end of a pivotal safety member 15 which is moved from the dotted line position indicated in FIG. 2 to the solid line position at which it will be flush against the side of the holder 3. In the solid line position the holding sleeve 9 tightly engages below the shoulder 6c and holds the tool 6 securely in an operative position. In order to facilitate complete engagement, the holding sleeve 9 is advantageously provided with an inclined wall 11 around its one side which engages a similarly inclined wall of the annular groove 6b of the shank portion 6a of the tool 6. In the holding position, the bore 9a is eccentrically arranged in respect to the axis of the tool 6 and the ram 1. The holding sleeve 9 is guided on a block 13 and it is firmly connected to a spring plate 37 so that it is urged in a direction toward tool engagement by the force of slide springs 39, 39. Upon actuation of the actuator bolt 25 the holding sleeve 9 is moved thereby to the left, as indicated in FIG. 1, to a released position permitting release of the tool 6. The spring plate 37 is of a length such that the slide 9 can be actuated in every position of the tool, ram 1 by means of the safety lever 15.

The safety lever 15 is pivoted about a bolt 16 supported on the tool holder 3 and in the outward released position a projecting portion or nose 15a engages against a push rod 19 which is slidably carried in a wall of the holder 3. The rod 19 bears at its opposite end against a tilting lever 23 which is pivoted on a pivot member 22. The tilting lever 23 bears against an actuator bolt 25 which is sildable in a bushing 29 and which is urged away from the sleeve 9 by means of a spring 28. When the tilting lever 23 is moved from the solid line position to the dotted line position upon opening of the safety lever 15, it is displaced against its spring 28 to bear against the slide 9 and to move it to a position at which the bore 9a clears the shoulder 6c of a tool 6 to permit the removal thereof. The projection 15a on the safety lever 15 will strike against the rod 19 to actuate the bolt 25 to move the slide 9 to a released position only when the safety lever is in a fully opened position. In the fully released position the ejection plunger 34 will move against the tool and direct it out of the bore 4.

A removable lock ring 40 is secured to the underface of the ram such as by securing screws (not shown). The underface of the ram 1 is provided with a groove 41 which receives a pin 44 which is carried in a hole 43 formed in the lock ring 40. Pin 44 secures the lock ring 40 and the tool 6 against rotation relative to the ram 1. The lock ring 40 advantageously includes a squared opening 40a through which the tool 6 extends. After alignment of the stamping tool 6 in relation to the die (not shown), the securing screws for the lock ring are tightened to secure the lock ring to the ram 1. After this is done, the tool 6 can no longer rotate relative to the ram 1.

While a specific embodiment of the invention has been shown and described in detail to illustrate the application of the inventive principles, it will be understood that the invention may be embodied otherwise without departing from such principles.

What is claimed is:

1. A cutting or stamping device using a tool having an engagement shoulder comprising a holder, a ram displaceably carried in said holder and having a bore opening at one end for receiving a tool therein, and a holding sleeve carried by said ram and being movable transversely to the axis of said bore of said ram, said holding sleeve having an opening for the passage of the tool therethrough when said holding sleeve is positioned in a non-operative position for releasing said tool, said holding sleeve being movable to an operative holding position in which the opening thereof is eccentric to the bore of said ram to engage below the engagement shoulder of said tool to hold it in position, a safety lever pivotally mounted on said holder for pivotal movement about an axis substantially parallel to the bore of said ram inwardly against a side of said holder and outwardly away from the side of said holder, said safety lever being connected to said holding sleeve to permit said holding sleeve to move to an operative position holding the tool when said safety lever is adjacent the side of said holder and to move to an inoperative position releasing the tool when said safety lever is opened outwardly from said holder.

2. A cutting or stamping device according to claim 1, wherein the walls bounding the opening of said holding sleeve are formed obliquely for engagement against an oblique surface of the tool.

3. A cutting or stamping device according to claim 1, including a tool having an annular groove defined therearound forming a shoulder at the upper end of said groove, said tool being of a size to pass freely through the opening of said holding sleeve, said holding sleeve being engageable in the groove of said tool and below the shoulder thereof.

4. A cutting or stamping device according to claim 1, wherein said ram has a recess in which said holding sleeve is positioned, and a block secured to said ram below said sleeve, said holding sleeve being slidable on said block.

5. A cutting or stamping device according to claim 1, including means connected to said slide urging said slide in a direction to engage with the tool.

6. A cutting or stamping device using a tool having an engagement shoulder comprising a holder, a ram displaceably carried in said holder and having a bore opening at one end for receiving a tool therein, and a holding sleeve carried by said ram and being movable transversely to the axis of said bore of said ram, said holding sleeve having an opening for the passage of the tool therethrough when said holding sleeve is positioned in a non-operative position for releasing said tool, said holding sleeve being movable to an operative holding position in which the opening thereof is eccentric to the bore of said ram to engage below the engagement shoulder of said tool to hold it in position, an actuating member for moving said holding sleeve to the inoperative position, and a safety lever pivotally mounted on said holder and being movable to move said holding sleeve between an operative and an inoperative position and being engageable with said actuating member to displace said actuating member to move said slide to an inoperative position only when said safety lever is in completely open position.

7. A cutting or stamping device using a tool having an engagement shoulder comprising a holder, a ram displaceably carried in said holder and having a bore opening at one end for receiving a tool therein, and a holding sleeve carried by said ram and being moveable transversely to the axis of said bore of said ram, said holding sleeve having an opening for the passage of the tool therethrough when said holding sleeve is positioned in a non-operative position for releasing said tool, said holding sleeve being movable to an operative holding position in which the opening thereof is eccentric to the bore of said ram to engage below the engagement shoulder of said tool to hold it in position, a safety lever pivotally mounted on said holder, an actuating member displaceably carried on said holder adjacent said holding sleeve, said safety lever being pivotal outwardly from said holding and being engageable with said actuating member to displace said slide to an inoperative position only when said operating lever is moved to an end position.

8. A cutting or stamping device using a tool having an engagement shoulder comprising a holder, a ram displaceably carried in said holder and having a bore opening at one end for receiving a tool therein, a holding sleeve carried by said ram and being movable transverse to the axis of the bore of said arm, said holding sleeve having an opening for the passage of the tool therethrough when the opening is aligned with the axis of the bore in an inoperative position of said holding sleeve, said holding sleeve being movable to an operative position in which the opening thereof is eccentric to the bore of said ram to engage below the engagement shoulder of the tool, means biasing said holding sleeve in a direction to engage below the engagement shoulder of the tool in an operative position, a safety lever pivotal at one end on said holder, an actuating member slidable in said holder in directions transverse to the bore of said ram and engageable with said holding sleeve to displace said holding sleeve against said biasing means, and means carried on said holder and actuated by opening of said safety lever to a fully opened position to move said actuating member to displace said sleeve to an inoperative position to release the tool.

9. A cutting or stamping device according to claim 8, including a lock ring secured to said ram and having an opening for the cutting tool with a configuration to engage the cutting tool to prevent rotation thereof relative to the ram.

10. A cutting or stamping device according to claim 8, including an ejector member carried by said ram and being displaceable in a direction parallel to the axis of said bore engageable against the inner end of the cutting tool when positioned therein, means biasing said ejector member in a direction to move the cutting tool outwardly from the bore.

References Cited

UNITED STATES PATENTS 1,179,476   4/1916   Thomas _____ 279—44

FOREIGN PATENTS 197,667   5/1958   Germany.
964,902   7/1964   Great Britain.

WILLIAM S. LAWSON, Primary Examiner

U.S. Cl. X.R.

279—44